United States Patent [19]
Glenn et al.

[11] Patent Number: 5,200,054
[45] Date of Patent: Apr. 6, 1993

[54] ICE ELECTRODE ELECTROLYTIC CELL

[75] Inventors: David F. Glenn; Dan F. Suciu; Taryl L. Harris; Jani C. Ingram, all of Idaho Falls, Id.

[73] Assignee: The United States of America as represented by the United States Department of Energy, Washington, D.C.

[21] Appl. No.: 917,243

[22] Filed: Jul. 22, 1992

[51] Int. Cl.$^5$ ............................ C25C 5/02; C25C 5/00; B22F 9/00
[52] U.S. Cl. ......................................... 205/74; 205/67; 204/236; 204/109; 204/130; 204/105 R; 204/114; 204/106; 204/241
[58] Field of Search ............... 204/236, 233, 232, 193, 204/64, 270, 109, 272, 130, 105 R, 114, 106, 241; 429/9; 75/343, 346, 351, 352; 205/74, 67

[56] References Cited

U.S. PATENT DOCUMENTS

| | | | |
|---|---|---|---|
| 5,015,344 | 4/1991 | Nidola et al. | 204/98 |
| 5,017,273 | 5/1991 | Woog | 204/109 |
| 5,114,471 | 5/1992 | Johnson et al. | 75/346 |
| 5,114,547 | 8/1992 | Ulman | 204/128 |

Primary Examiner—Donald P. Walsh
Assistant Examiner—Anthony Chi
Attorney, Agent, or Firm—Hugh W. Glenn; Robert J. Fisher; William R. Moser

[57] ABSTRACT

This invention relates to a method and apparatus for removing heavy metals from waste water, soils, or process streams by electrolytic cell means. The method includes cooling a cell cathode to form an ice layer over the cathode and then applying an electric current to deposit a layer of the heavy metal over the ice. The metal is then easily removed after melting the ice. In a second embodiment, the same ice-covered electrode can be employed to form powdered metals.

12 Claims, 5 Drawing Sheets

ICE ELECTRODE ELECTROLYTIC CELL

CONTRACTUAL ORIGIN OF THE INVENTION

The United States Government has rights in this invention pursuant to Contract No. DE-AC07-76ID01570 between the United States Department of Energy and EG&G Idaho, Inc.

FIELD OF THE INVENTION

The present invention relates to a novel, renewable-surface electrode for electrochemical processes.

BACKGROUND OF THE INVENTION

An electrode is a conductor, usually metal, immersed in an electrolyte solution (i.e., electronic conductor in contact with an electrolytic conductor) that serves either as a source (the cathode) or sink (the anode) of electrons. The application of an electromagnetic force, e.m.f., between two such electrodes in an electrolyte solution will give rise to electrochemical reactions on the surface of both electrodes. The nature of the electrode material dictates the electrochemical reactions that will occur.

Mercury is widely used as an electrode in the practice of electroanalytical chemistry. The dropping mercury electrode, DME, is the essential component of all polarographic experiments. Usually, the DME is formed by glass capillary tubing connected to a standpipe of plastic or glass attached to a mercury reservoir. If the level of mercury in the standpipe is sufficiently high with respect to the tip of the capillary, mercury flows from the capillary at a steady rate, small drops form at the end, and the drops fall at a regular interval. Electrolysis is carried out on the surface of the mercury drops.

One of the most important advantages of the DME is continuous renewal of the electrode surface. As the old drop falls away, a new drop is formed providing a fresh, clean surface for electrolysis reactions. A major disadvantage of the DME is its small size makes it inapplicable for large scale electrochemical processes.

Examples of large scale electrochemical processes are electrowinning, electrorefining and the electrochemical generation of hydrogen. Anodic processes include inorganic and organic systhesis and the electrochemical generation of oxygen and chlorine. Electrodes used in these processes are generally metal.

In conventional large-scale electrolysis, the electrolysis products typically are deposited on the surface of the electrodes. For gaseous and liquid products, the isolation of these products from the cathode and anode is easily accomplished. Solid products, on the other hand, require additional chemical methods to achieve isolation. In many applications, this deposition of the solid product at the working electrode is the desired result, as is the case in electroplating. However, in other applications, it would be advantageous to have a system in which the solid product is easily isolated, for example, in the processing of metals and metal alloys. Also, in conventional electrolysis, side reactions may occur resulting in the corrosion of the electrodes. Thus, an electrode surface which is renewable would be beneficial to minimize corrosion.

The present invention addresses the problems associated with electrolysis described above, namely, easy recovery of electrolysis product and renewability of the electrode surface. A description of the present invention as well as the objectives of the invention are discussed below.

SUMMARY OF THE INVENTION

It is the objective of the present invention to provide an electrode having a renewable surface or sacrificial coating.

Another objective of the present invention is to provide a process and apparatus to recover metals from industrial wastes, soils, and process streams.

Another objective of the invention is to provide a process for the production of powdered metals.

Yet another objective of the invention is to provide a process whereby the reaction products of an electrochemical process can be concentrated and readily recovered from the reaction medium.

To accomplish the foregoing objectives, an electrically conducting substrate is coated with a thin sheath of frozen liquid (ice) that can serve either as a source (a cathode) or sink (an anode) for electrons in an electrochemical cell.

In a preferred embodiment, the substrate (usually a hollow metal rod) contains an internal conduit through which a cooled refrigerant flows such that a layer of ice is caused to form over the surface of the substrate immersed in a liquid medium. The thickness of the ice is controlled by the flow rate of the refrigerant. The ice electrode is used in an electrochemical cell consisting of a liquid electrolyte, an anode and cathode within the electrolyte. In the cell, the ice electrode may be used either as anode and/or cathode.

When an electrical current is passed through the conducting substrate of the ice electrode, electrochemical reactions that would normally occur on the surface of the substrate now occur on the surface of the ice. For example, if the ice electrode is used as the cathode in a liquid containing palatable metal ions, metal particles are deposited on the ice layer.

If the ice layer is allowed to grow during the electrolysis process, reaction products are be trapped in the ice layer, thus, allowing easy recovery of these concentrated products by melting the ice.

The ice layer provides a readily renewable electrode surface. The surface layer of the ice can be made to undergo periodic melting and refreezing producing a fresh, clean ice electrode surface. The periodicity of this renewal can be controlled by the cooling rate.

The periodic melting of the surface layer of ice causes the reaction products to be removed from the surface of the electrode. In the case of metal deposition, the metal particles fall away from the surface. Rapid periodic melting and refreezing limits the growth of the metal crystals thus providing a method for the production of metal powders.

In addition, an ice electrode contaminated with electrolysis products (for example, metal particles) can be allowed to melt completely and a new ice layer frozen over the surface of the substrate.

DETAILED DESCRIPTION OF THE INVENTION

Figure 1:
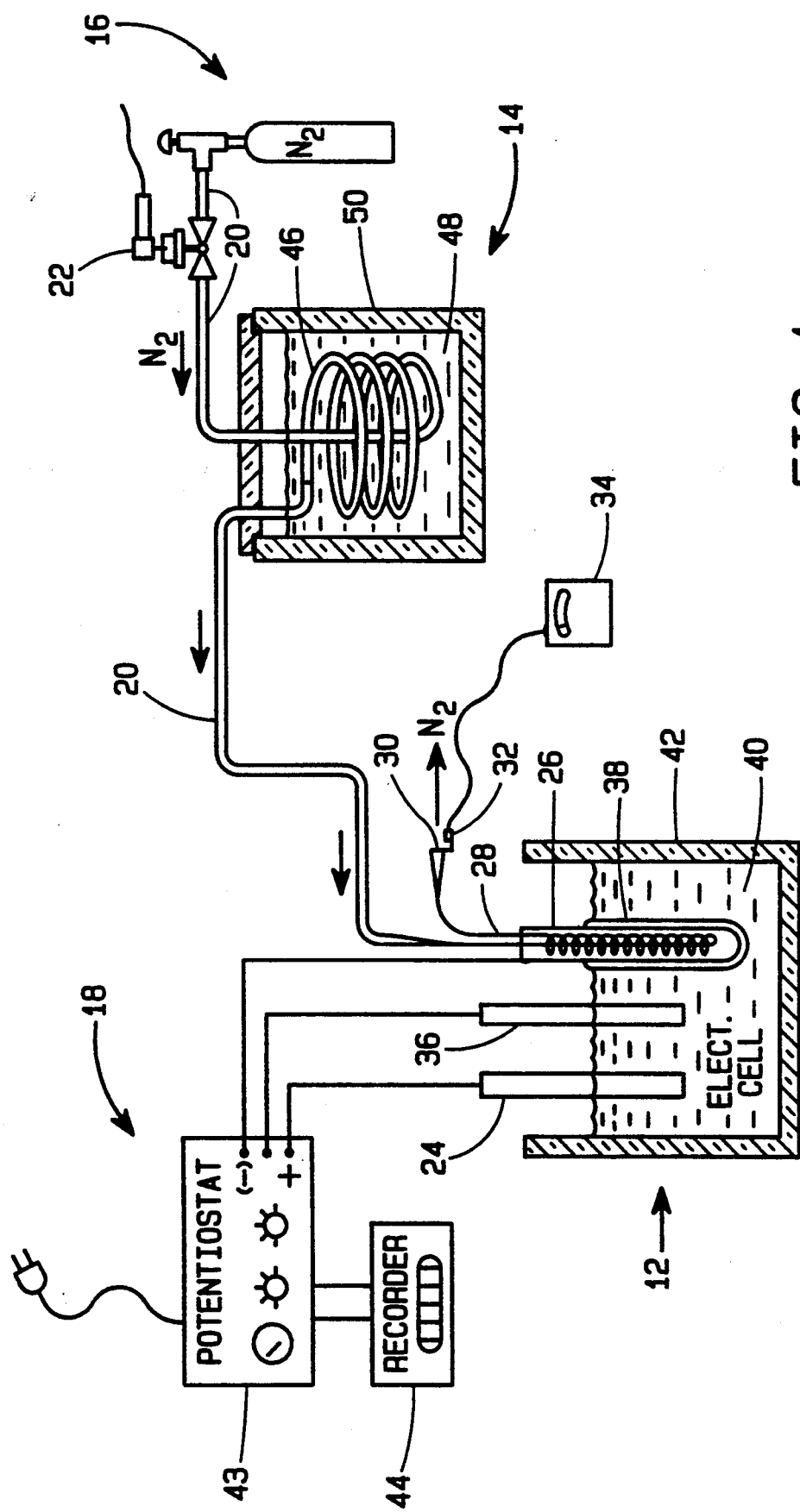
FIG. 1 is a schematic diagram of the apparatus of the present invention.

FIG. 1 represents a schematic diagram of a laboratory apparatus 10 related to the present invention for extracting a heavy metal from a solution. The apparatus 10 consists of an electrolytic cell 12, a heat exchanger 14, a refrigerant fluid supply or reservoir 16, and an electric power supply 18. Suitable conduits 20 carry the refrigerant from the fluid supply 16 to the electrolytic cell 12 having a valve control means in the conduit to control refrigerant flow to the heat exchanger 14 and then to the electrolytic cell 12.

The electrolytic cell 12 has an anode 24 and a cathode 26. An internal refrigerant conduit 28 is coiled within the cathode 26, to provide for refrigerant flow within the cathode 26, and exiting the cathode in this experiment at exhaust 30. Exhaust 30 refrigerant temperature is monitored by a temperature sensor 32 that can be used with a temperature indicator 34 or used to control refrigerant flow through valve control means 22. In this cell 12 a third sensing electrode 36 is used as a reference for measuring the potential at electrode 26.

The ice coating forms from the water within electrolyte 40, held within container 42, as a result of the refrigerant passing through conduit 28.

The application of a voltage and the resultant current flow is controlled by the potentiostat 42 and monitored by recorder 44.

In this experiment, the refrigerant $N_2$, from refrigerant fluid supply 16, passes through heat exchanger coils 46 within a liquid nitrogen bath 48 within $N_2$ container 50. The cold liquid nitrogen 48 cools the $N_2$ gas below the water freezing point as it passes through the heat exchanger coils 46 and through conduit 20 to the cathode internal refrigerant conduit 28, where it cools cathode 26 to form ice coating 38.

In operation, after an ice coating 38 is formed, the power supply 18 and potentiostat 42 apply a voltage (and resulting current) to the electrodes 24 and 26 and a normal electrolytic process (reduction) causes formation of a coating of heavy metal at the cathode over the ice coating 38.

Figure 2:
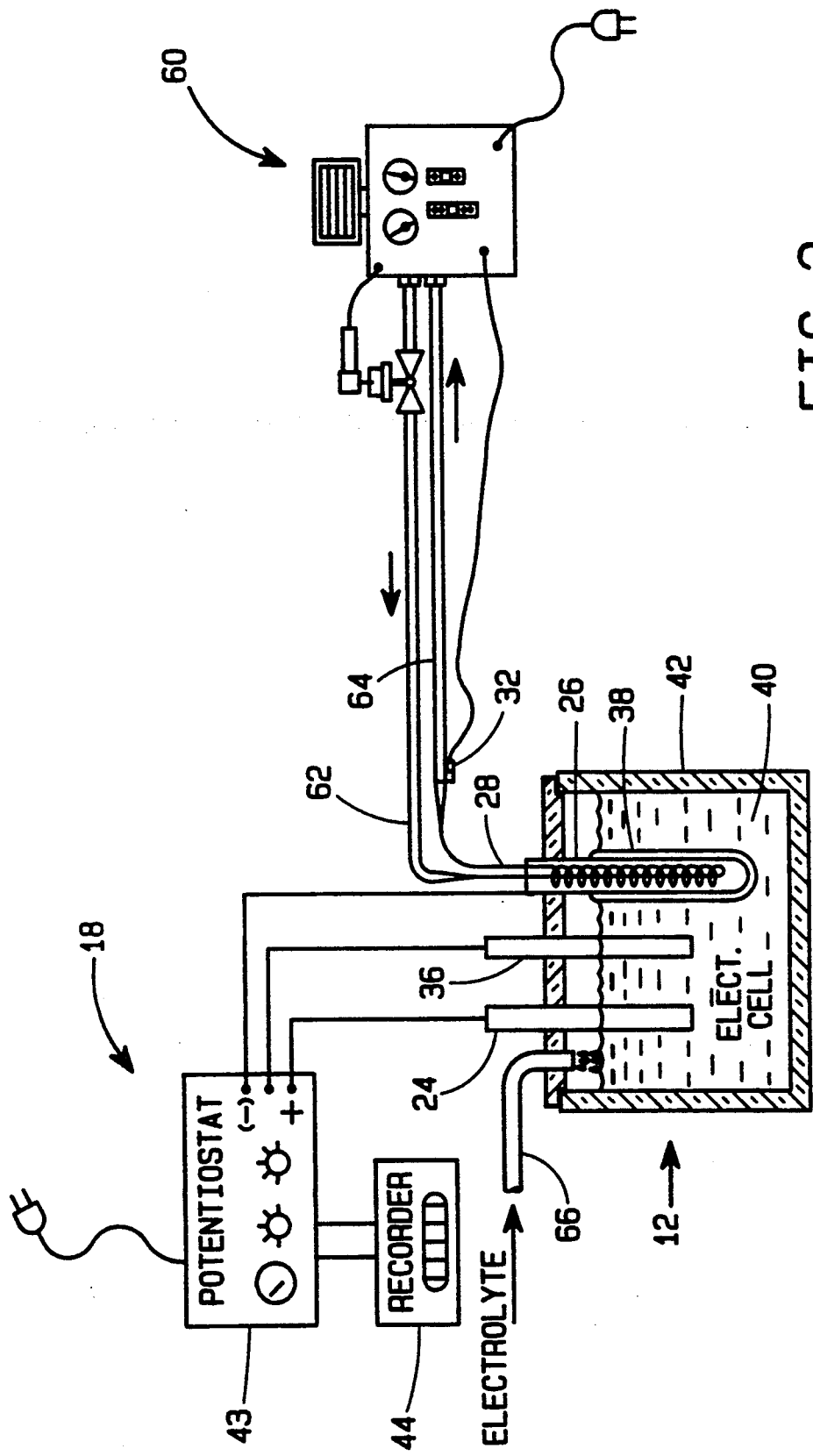
FIG. 2 is a schematic diagram of a second embodiment of the apparatus.

A second embodiment is illustrated in FIG. 2 disclosing the electrolytic cell 12 cathode 26 being refrigerated by a refrigeration unit 60 having a compressor, heat exchanger, valves, and controls (not shown). In this system, the refrigerant is pumped to the cathode 26 via conduit 62 and, after cooling cathode 26, is returned to unit 60 via conduit 64. Temperature sensor 32 is used in this case to control refrigerant cooling flow or temperature within unit 60. Electrolyte may be added at electrolyte supply conduit 66, thereby providing for a continuous process, until metal removal is required.

Figure 3:
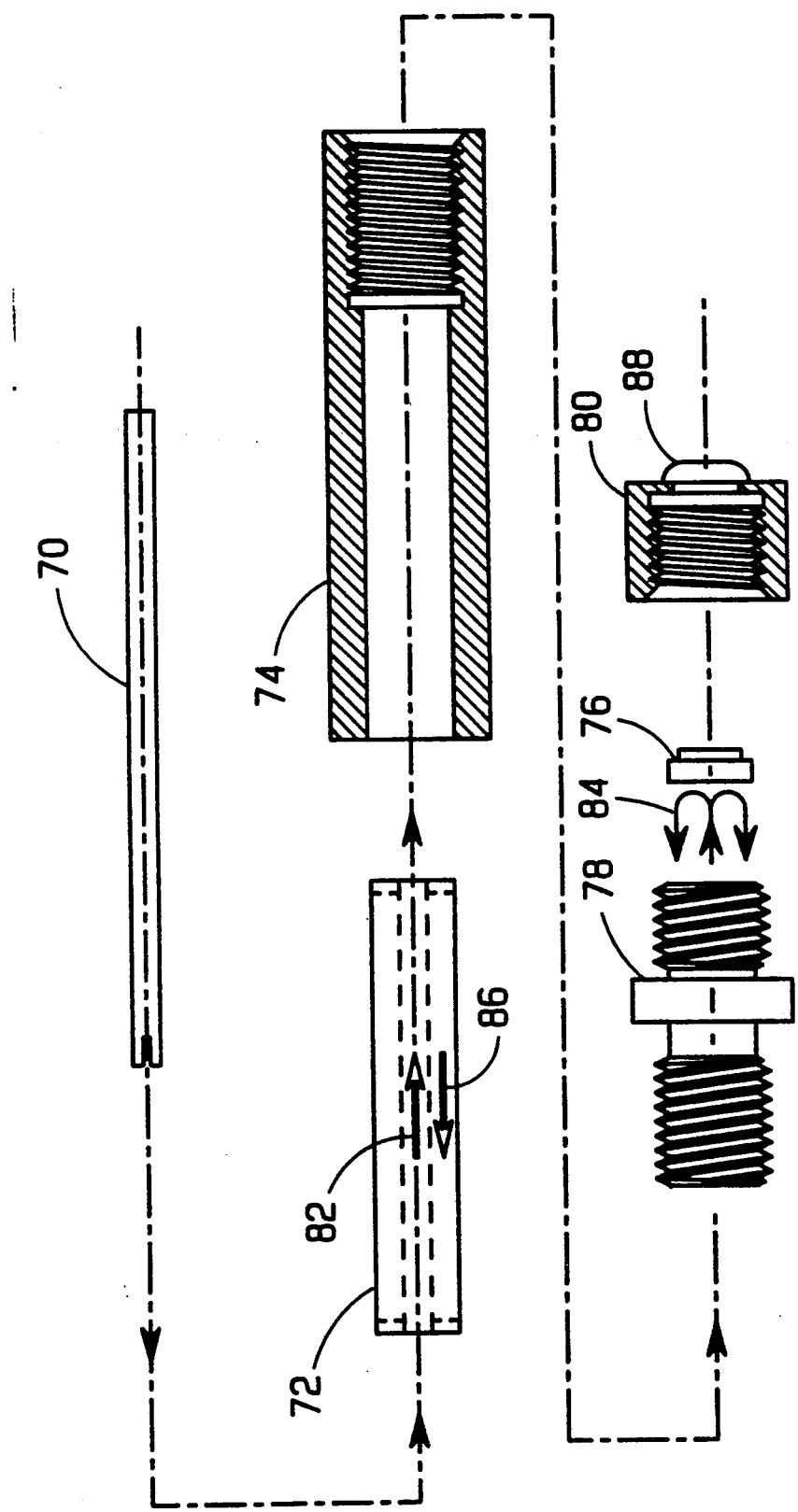
FIG. 3 is an exploded view of the ice electrode of the present invention.

FIG. 3 is an exploded view of an experimental ice electrode of the present invention which is represented by electrode 26 in FIG. 1. The cooled $N_2$ gas is introduced through a tube 70. The tube 70 is held in place by the baffle 72 inside the electrode housing 74. The electrode metal substrate 76 is held in the housing 74 by insert 78 and cap 80. The cooled $N_2$ gas flows through the tube 70 as at arrow 82, passes adjacent the substrate 76 as at 84, and is emitted out in a reverse direction 86 through the baffle 72. The geometry of the substrate 76 is shown as a flat surface; however, other geometries may also be used as effectively (i.e., rounded surface, rod shaped, etc.). The ice layer is formed at the substrate at 88. The substrate material used in the experiments was either platinum or stainless steel; however, other metal substrates could also be employed.

EXAMPLE 1

This example demonstrates the laboratory electrowinning of a variety of metals from metal salt solutions using the ice electrode. The following table lists the solution conditions and applied potentials in volts versus saturated calomel electrode (SCE) used to electrodeposit each metal out of solution.

| Metal | Solution | Applied Potential (volts vs. SCE) |
| --- | --- | --- |
| Copper | 0.1 M $CuSO_4$ | −2.0 |
| Zinc | 0.5 M $ZnSO_4$ | −3.0 |
| Silver | 0.04 M $Ag_2SO_4$ | −2.0 |

Figure 4:
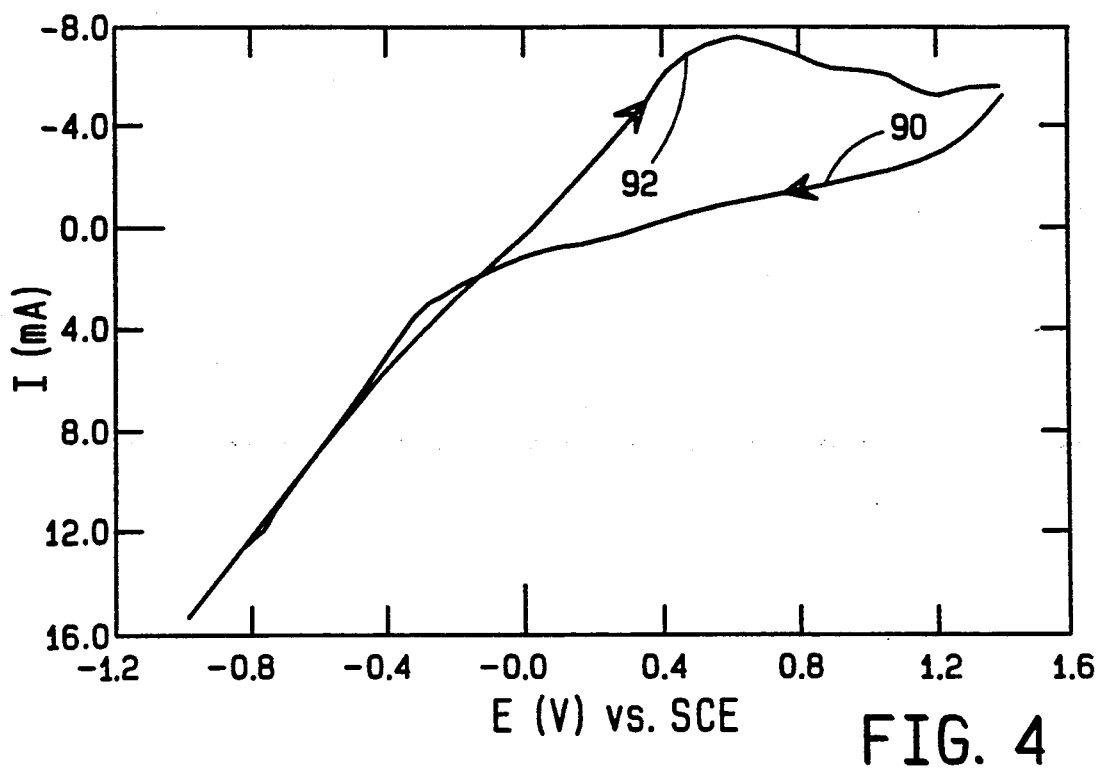
FIG. 4 is a cyclic voltammogram of copper deposition at a stainless steel electrode.
Figure 5:
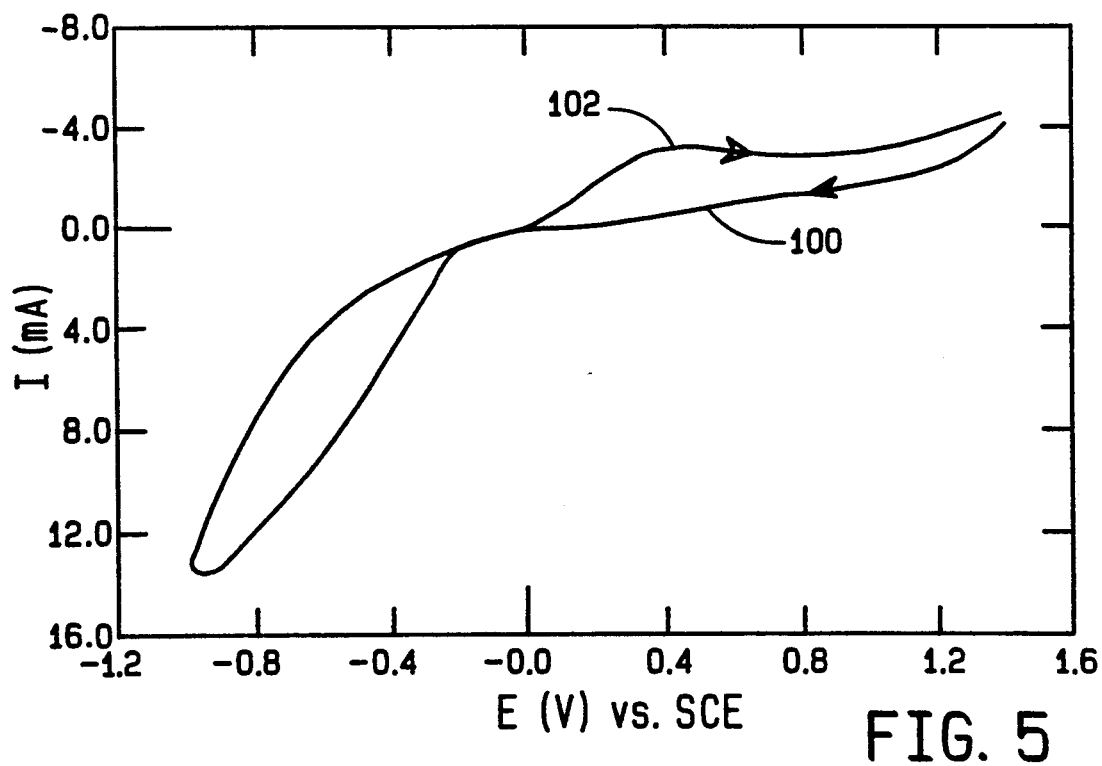
FIG. 5 is a cyclic voltammogram of copper deposition at an ice covered electrode.

In FIG. 4, cyclic voltammograms (CVs) are shown of the copper deposition in $CuSO_4$ at a stainless steel electrode. FIG. 5 shows copper deposition at an ice electrode, i.e., an ice layer on a stainless steel substrate. These plots represent the change in current as a function of changing the potential in $CuSO_4$ electrolyte. As the potential is made more negative as at 90, the copper cations in solution are reduced to copper metal:

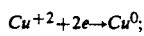

$$Cu^{+2} + 2e \rightarrow Cu^0;$$

thus, the current is proportional to the amount of copper deposited. These continuous curves are decreasing at 90 and 100 and increasing at 92 and 102. The CVs in FIG. 4 indicate that copper deposition at the stainless steel electrode is more facile than at the ice electrode of FIG. 5. These results are to be expected based on the conductivity of stainless steel and ice. Nonetheless, copper deposition does occur at the ice electrode.

EXAMPLE 2

Figure 6:
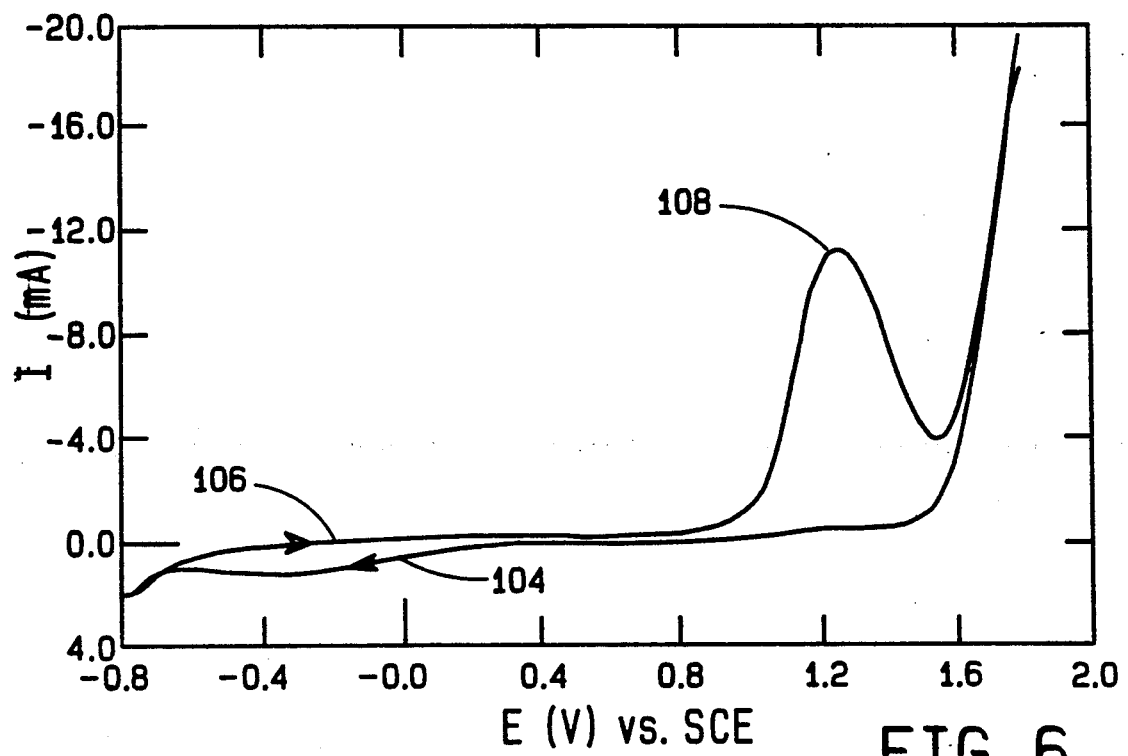
FIG. 6 is a cyclic voltammogram of a stainless steel electrode in a weakly acidic solution.
Figure 7:
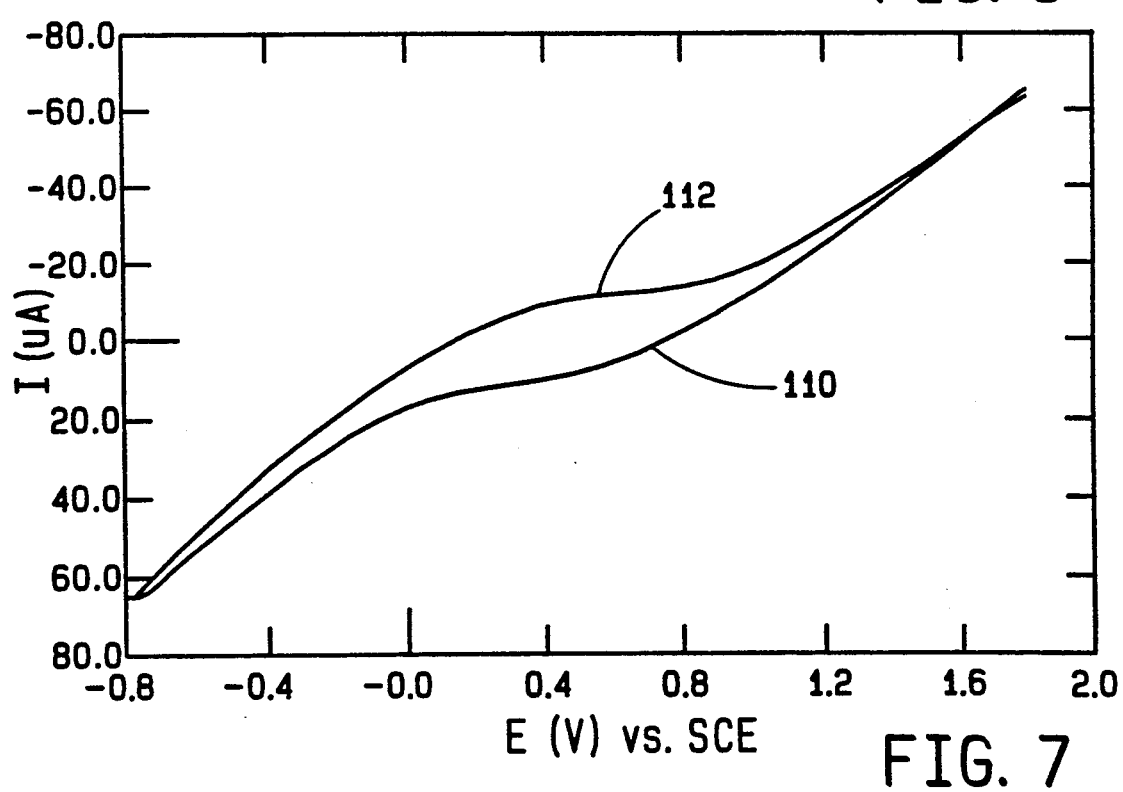
FIG. 7 is a cyclic voltammogram of an ice covered electrode in a weakly acidic solution.

This example demonstrates the utility of using the ice electrode to minimize corrosion effects. In FIG. 6, a CV of a stainless steel electrode in 0.1M $H_2SO_4$, FIG. 6 is compared to FIG. 7, a CV of an ice electrode having an ice layer on a stainless steel substrate in the same solution. These plots also indicate decreasing voltage values at 104 and 110 and increasing values at 106 and 112. These CVs compare similarly to the CVs shown in FIGS. 4 and 5 of a copper deposition at similar electrodes, i.e., more facile electrolysis at the stainless steel electrode compared to the ice electrode. In the stainless steel CV of FIG. 6, a peak 108 is present in the anodic region which is absent in the ice CV of FIG. 7. This peak 108 is attributed to the corrosion of the stainless steel surface. As a result of this anodic process, the stainless steel electrode has been altered. Rejuvenation of the surface may involve chemical treatment; however, many alterations are, for intensive purposes, irreversible. The ice electrode, on the other hand, has not undergone any corrosion at these potentials. Additionally, if the ice electrode had exhibited some type of corrosion process, the surface could be renewed simply by melting and refreezing the ice.

While preferred embodiments of the invention are disclosed, various modes of carrying out the principles disclosed herein are contemplated as being within the scope of the following claims.

What is claimed is:

1. An apparatus for the recovery of a heavy metal from waste water, soil, and process streams comprising:
   a. an electrolytic cell containing an electrolyte;
   b. an anode within the electrolyte;
   c. a cathode within the electrolyte having an internal refrigerant conduit; and
   d. a refrigeration means providing a controllable cold refrigerant by conduit to the cathode internal refrigerant conduit, wherein refrigerant flow through the cathode forms a layer of ice surrounding the cathode and a layer of heavy metal is deposited over the layer of ice on application of an electric current to the cathode and anode.

2. The apparatus of claim 1 and wherein the electrolyte is silver sulfate and the heavy metal is silver.

3. The apparatus of claim 1 and wherein the electrolyte is zinc sulfate and the heavy metal is zinc.

4. The apparatus of claim 1 and wherein the electrolyte is copper sulfate and the heavy metal is copper.

5. The apparatus of claim 1 and wherein the refrigeration means is nitrogen gas cooled by a liquid nitrogen bath.

6. The apparatus of claim 1 and wherein the refrigeration means is a refrigeration unit.

7. A process for the production of a powdered metal comprising:
   a. dissolving a metal salt in a liquid medium within an electrolytic cell;
   b. inserting an anode and a cathode within the cell, said cathode having an internal refrigerant conduit;
   c. forming an ice coating on a cathode surface; and
   d. periodically melting and refreezing the ice coating, thereby allowing the metal powder to fall away from the surface.

8. An electrochemical process for concentrating a reaction product within a reaction medium comprising:
   a. filling an electrolytic cell with a liquid medium;
   b. inserting a counter electrode and working electrode within the electrolytic cell;
   c. forming an ice coating on the working electrode that is controlled such that the thickness of the ice layer grows at a rate sufficient to trap the reaction products in the ice;
   d. allowing the ice to melt; and then
   e. recovering the concentrated reaction product.

9. An electrochemical process to recover contaminant metals from a contaminated soil comprising:
   a. inserting an anode within the soil;
   b. inserting a cathode having an internal refrigerant conduit within the soil;
   c. forming a layer of ice by a refrigeration means on the cathode;
   d. applying an electric current between the two electrodes;
   e. reducing contaminant metals ions on the layer of ice to a base metal;
   f. recovering the contaminant metals by removing the cathode from the soil; and then
   g. allowing the layer of ice to melt.

10. An electrolytic cell for removal of chemical elements from ions in solution, comprising:
    a. a suitable container for holding an electrolyte;
    b. an anode adapted for connection to an outside power supply disposed within said electrolyte; and
    c. a cathode adapted for connection to an outside power supply disposed within said electrolyte, said cathode being covered with a means for collecting on a sacrificial coating, the deposited chemical element that is removed from said electrolyte electrolytic solution when a suitable potential difference is applied between said anode and said cathode to provide for later removal of said sacrificial coating with attached chemical element from said cathode for convenient recovery of said chemical element.

11. The electrolytic cell of claim 10 wherein the deposited chemical element is one of the heavy metals and the sacrificial coating is a layer of ice surrounding a portion of the cathode that is immersed within the electrolyte.

12. The electrolytic cell of claim 11 wherein an internal refrigerant conduit is disposed within said cathode, said internal refrigerant conduit being adapted for connection to a source of cold refrigerant to provide for forming the layer of ice surrounding the cathode when the cold refrigerant flows through the cathode internal refrigerant conduit.

* * * * *